E. H. RUCKLE.
ELECTRIC BAKER'S OVEN.
APPLICATION FILED FEB. 27, 1914.
1,203,909. Patented Nov. 7, 1916.
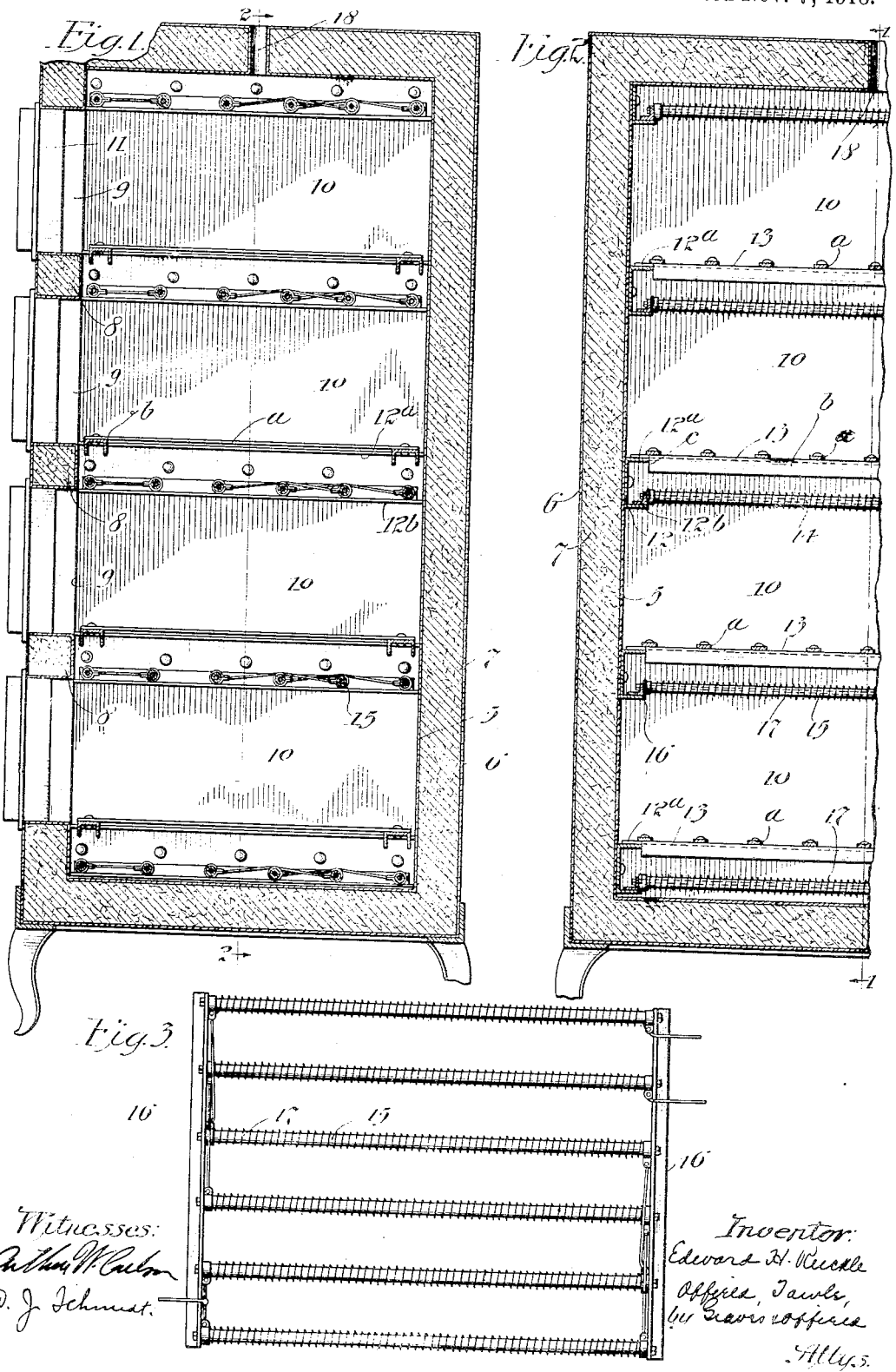

UNITED STATES PATENT OFFICE.

EDWARD H. RUCKLE, OF CHICAGO, ILLINOIS, ASSIGNOR TO HUGHES ELECTRIC HEATING COMPANY, OF CHICAGO, ILLINOIS, A CORPORATION OF ILLINOIS.

ELECTRIC BAKER'S OVEN.

1,203,909.   Specification of Letters Patent.   Patented Nov. 7, 1916.

Application filed February 27, 1914.   Serial No. 821,361.

*To all whom it may concern:*

Be it known that I, EDWARD H. RUCKLE, a citizen of the United States, and a resident of Chicago, in the county of Cook and State of Illinois, have invented certain new and useful Improvements in Electric Bakers' Ovens, of which the following is a specification.

My invention relates to electric ovens, and particularly to multiple compartment bakers' ovens.

It is well known that to insure excellence in cooking and baking uniform distribution of heat is an absolute requisite. Owing to the lack of such even distribution of heat to all parts of the oven, electric ovens as heretofore constructed have not been entirely successful, the usual practice having been to concentrate heating units at the bottom of the oven and employing various methods for forcing the circulation of heat to the various parts of the oven. With such arrangement the circulation and uniformity of heat is variable and uncertain and the best results can not be obtained.

The important object of my invention is to provide improved arrangement which will insure uniform heat distribution and application and more efficient results. Instead of placing the heating source at the bottom of an oven structure and depending on the variable and uncertain circulation of heat, I provide local heating means in each of the oven compartments by generating beneath each shelf or rack the correct proportionate amount of heat for a constant even baking through all parts of the articles to be baked. The heating unit directly below each grid or shelf will throw heat upwardly into the compartment above the grid and will throw heat downwardly into the compartment below the grid, each compartment thus receiving heat from both below and above, and such heat is constant and uniform and entirely surrounds the articles to be cooked.

On the accompanying drawing my improved arrangement is clearly illustrated, Figure 1 being a sectional view on plane 1—1, Fig. 2, Fig. 2 being a sectional view on plane 2—2, Fig. 1, and Fig. 3 being a plane view of one of the electric heating grids.

The oven structure shown is rectangular and is preferably built up of inner and outer sheet metal walls 5 and 6 between which heat insulating material 7 is filled in, all in the well known manner. Extending across the front of the structure are the sills 8 for the entrance ways 9 to the oven compartments 10, each entrance way being adapted to be closed by a door 11. Secured to the side walls of the oven structure and in line with the sills I have shown channel bars 12 whose upper flanges $12^a$ serve to support grids or racks 13 and whose lower flanges $12^b$ serve to support electrical heating elements 14. The supporting grid may be of any construction. In the construction shown grid bars $a$ connect together the end bars $b$ of channel cross section, the flanges of the bars being cut away inwardly from the ends as indicated at $c$ to clear the supporting flanges $12^a$ of the channels 12.

The construction of the heating units is best shown in Fig. 3. Insulating rods 15 which may be asbestos tubes extend parallelly between end supporting angle bars 16, and on the rods 15 heating conductors 17 are wound. These heating units are supported by engagement of the end bars 16 with the lower flanges $12^b$ of the supporting channels 12. Each heating element is thus directly below the supporting grid of the oven compartment above and is at the top of the oven below so that each element throws heat upwardly into one compartment and downwardly into the other, and the elements being electrically designed to throw off a predetermined amount of heat, the heat throughout the oven is uniform and constant. Each article to be cooked is directly heated by the element directly below the supporting grid and is also heated from the top by the element below the grid above. No uncertain and variable circulation need therefore be depended upon for distributing heat to the various parts of the oven. In fact with my arrangement no circulation of any kind is at all necessary and the oven can be entirely sealed so far as uniformity of heat distribution is concerned. Preferably, however, a small vent 18 is provided to relieve against expansion and contraction within the oven and to allow escape of vapors when desired.

The individual heating units or elements can be connected together in any manner and with a main circuit and the current flow controlled to effect low, intermediate, or high heat production as is well understood.

I claim the following:

In an electric bake oven, the combination of an insulated oven structure, an electrical heating element at the top of said structure, an electrical heating element at the bottom of said structure, intermediate heating elements between said upper and lower heating elements, said heating elements extending horizontally the full distance between the front and rear walls of said oven structure and said oven structure being closed whereby heat circulation is prevented in said structure and heat applied by radiation against the top and bottom of articles placed on said heating elements to be baked, the arrangement as described causing the heat to be uniform throughout the structure and enabling the full capacity of the structure to be used for baking.

In witness whereof, I hereunto subscribe my name this 25th day of February, A. D. 1914.

EDWARD H. RUCKLE.

Witnesses:
CHARLES J. SCHMIDT,
EDMUND G. INGERSOLL.